United States Patent [19]

Meixner et al.

[11] Patent Number: 5,142,015

[45] Date of Patent: Aug. 25, 1992

[54] UNSATURATED URETHANIZED POLYESTER RESINS, A PROCESS FOR THEIR PRODUCTION AND THEIR USE FOR THE PRODUCTION OF COATINGS

[75] Inventors: Jürgen Meixner, Krefeld; Wolfgang Kremer, Kerken; Manfred Müller, Erkelenz, all of Fed. Rep. of Germany

[73] Assignee: Bayer Aktiengesellschaft, Leverkusen, Fed. Rep. of Germany

[21] Appl. No.: 600,557

[22] Filed: Oct. 19, 1990

[30] Foreign Application Priority Data

Oct. 25, 1989 [DE] Fed. Rep. of Germany ....... 3935495

[51] Int. Cl.⁵ .......................... C08G 18/67; B05D 3/02
[52] U.S. Cl. .......................... 528/49; 528/50; 528/56; 528/73; 528/75; 427/385.5
[58] Field of Search ................. 528/75, 52, 48, 56, 528/49, 50, 73; 427/385.5

[56] References Cited

U.S. PATENT DOCUMENTS

| | | | |
|---|---|---|---|
| 3,703,498 | 11/1972 | Harris | 525/440 |
| 4,280,979 | 7/1981 | Dunleavy et al. | 528/52 |
| 4,289,682 | 9/1981 | Peters | 528/75 |
| 4,303,567 | 12/1981 | Frank et al. | 525/444 |
| 4,760,111 | 7/1988 | Ambrose et al. | 524/738 |
| 4,894,430 | 1/1990 | Höhlein et al. | 528/75 |

FOREIGN PATENT DOCUMENTS

| | | |
|---|---|---|
| 1075399 | 7/1967 | United Kingdom . |
| 1406545 | 9/1975 | United Kingdom . |
| 2164345 | 3/1986 | United Kingdom . |

*Primary Examiner*—John Kight, III
*Assistant Examiner*—John M. Cooney, Jr.
*Attorney, Agent, or Firm*—Joseph C. Gil; Thomas W. Roy

[57] ABSTRACT

The present invention relates to a process for the production of olefinically unsaturated polyester resins containing at least 0.025 moles of urethane groups per 100 g of resin by reacting A) olefinically unsaturated polyester resins which contain alcoholic hydroxyl groups, have a molecular weight ($M_n$) of 800 to 10,000, an acid vlaue of 0 to 50 and a hydroxyl number of 30 to 120, and are based on the reaction product of
  I) a dicarboxylic acid component containing a) 90 to 100 mole percent of maleic acid, maleic anhydride and/or fumaric acid and b) 0 to 10 mole percent of another carboxylic acid and
  II) 1.1 to 1.5 moles, based on one mole of the dicarboxylic acid component, of a polyol component containing c) 0.1 to 0.5 moles of at least one saturated cycloaliphatic diol having 6 to 18 carbon atoms, d) 0.5 to 0.9 moles of at least one saturated aliphatic diol having 2 to 6 carbon atoms and e) 0.1 to 0.5 moles of at least one $\beta,\gamma$-ethylenically unsaturated ether alcohol having 5 to 14 carbon atoms, with B) an organic polyisocyanate based on a member selected from the group of biuret-, isocyanurate-, uretdione- and urethane-modified polyisocyanates having 8 to 30% by weight of (cyclo)-aliphatically bound isocyanate groups in an amount sufficient to provide a ratio of isocyanate groups of component B) to hydroxyl groups of component A) of 0.1:1 to 1:1.

The present invention also relates to the olefinically unsaturated polyester resins containing urethane groups obtained by this process and to coatings prepared from coating compositions based on these olefinically unsaturated polyester resins and cured by free radical polymerization.

5 Claims, No Drawings

UNSATURATED URETHANIZED POLYESTER RESINS, A PROCESS FOR THEIR PRODUCTION AND THEIR USE FOR THE PRODUCTION OF COATINGS

BACKGROUND OF THE INVENTION

1. Field of the Invention

This invention relates to a process for the production of new, unsaturated urethanized polyester resins, to the polyester resins obtained by this process and to coatings prepared from coating compositions based on these polyester resins and cured by free radical polymerization, especially coatings for wood or wood-like materials.

2. Description of the Prior Art

Unsaturated polyester resins are known as binders for coating compositions. They are cured by free radical polymerization. The polymerization is initiated either by redox systems, such as metal salts or hydroperoxides, or by UV irradiation in the presence of a photoinitiator. Since the coating compositions are mainly intended for wood and wood-like materials, they can only be cured at temperatures from room temperature to at most 80° C. At these temperatures, the curing times are longer than those of other paint film binders. For example, coatings which dry purely physically (by evaporation of the solvent) cure much more quickly than coatings based on unsaturated polyester resins.

However, these faster drying coatings do not achieve the property level of coatings produced from unsaturated polyester resins as binders.

Numerous attempts have already been made to modify the unsaturated polyester resins in such a way that faster curing rates are obtained. Thus, as described for example in DE-OS 2 360 366 or DE OS 1 520 695, unsaturated polyester resins are reacted with isocyanates. This reaction provides products of relatively high viscosity with improved, but still inadequate curing times.

Special polycyclic alcohols are capable, when used as an esterification component in unsaturated polyester resins, of imparting a tack-free paint film surface to the unsaturated polyester resins after curing despite the presence of atmospheric oxygen (see Wagner-Sarx: "Lackkunstharze", Carl Hanser Verlag, Munchen, 1971, page 138). However, the coatings generally show inadequate hardness and, in addition, are not resistant to solvents.

Accordingly, an object of the present invention is to provide new polyester resins which are not attended by the disadvantages mentioned above, i.e., are suitable for the production of free radical-curing coating compositions, which cure quickly both under UV irradiation and with the aid of peroxides and provide coatings having hard surfaces which are resistant to water and chemicals.

Surprisingly, this object may be achieved by the process according to the invention which is described in more detail hereinafter. In this process certain olefinically unsaturated polyester resins A) are reacted with certain polyisocyanates B) in specific quantitative ratios.

SUMMARY OF THE INVENTION

The present invention relates to a process for the production of olefinically unsaturated polyester resins containing at least 0.025 moles of urethane groups per 100 g of resin by reacting A) olefinically unsaturated polyester resins which contain alcoholic hydroxyl groups, have a molecular weight ($M_n$) of 800 to 10,000, an acid value of 0 to 50 and a hydroxyl number of 30 to 120, and are based on the reaction product of I) a dicarboxylic acid component containing a) 90 to 100 mole percent of maleic acid, maleic anhydride and/or fumaric acid and b) 0 to 10 mole percent of an acid or anhydride component based on a member selected from the group of aromatic dicarboxylic acids containing 8 carbon atoms, saturated aliphatic dicarboxylic acids containing 4 to 10 carbon atoms, saturated or olefinically unsaturated cycloaliphatic dicarboxylic acids containing 6 to 10 carbon atoms and anhydrides of these dicarboxylic acids and II) 1.1 to 1.5 moles, based on one mole of the dicarboxylic acid component, of a polyol component containing c) 0.1 to 0.5 moles of at least one saturated cycloaliphatic diol having 6 to 18 carbon atoms, d) 0.5 to 0.9 moles of at least one saturated aliphatic diol having 2 to 6 carbon atoms and e) 0.1 to 0.5 moles of at least one $\beta,\gamma$-ethylenically unsaturated ether alcohol having 5 to 14 carbon atoms, with B) an organic polyisocyanate based on a member selected from the group of biuret-, isocyanurate-, uretdione- and urethane-modified polyisocyanates having 8 to 30% by weight of (cyclo)aliphatically bound isocyanate groups in an amount sufficient to provide a ratio of isocyanate groups of component B) to hydroxyl groups of component A) of 0.1:1 to 1:1.

The present invention also relates to the olefinically unsaturated polyester resins containing urethane groups obtained by this process and to coatings prepared from coating compositions based on these olefinically unsaturated polyester resins and cured by free radical polymerization.

DETAILED DESCRIPTION OF THE INVENTION

The unsaturated, urethanized polyester resins to be used in the process according to the invention have a urethane group content of at least 0.025, preferably from 0.03 to 0.01 and more preferably from 0.04 to 0.08 moles of urethane groups per 100 g of resin. A urethane group content of more than 0.1 moles per 100 g of resin is possible in particular when polyisocyanates already containing urethane groups are used as the polyisocyanates B), so that the total content of urethane groups in the urethanized polyester resins is made up of the urethane groups introduced via the polyisocyapate B) and the urethane groups formed by the reaction of isocyanate groups with hydroxyl groups in the reaction according to the invention.

The unsaturated polyester resins A) have an acid value of D to 50, preferably 5 to 40; a hydroxyl number of 30 to 120, preferably 40 to 100; and a number average molecular weight ($M_n$, as determined by gel permeation chromatography using polystyrene as standard) of 800 to 10,000, preferably 1,000 to 5,000.

In the production of the unsaturated polyester resins A) the dicarboxylic acid component preferably contains 1 mole of component a) and 0 moles of component b). Each mole of the dicarboxylic component is preferably reacted with 1.1 to 1.5 moles of a polyol component containing 0.15 to 0.45 moles of component c), 0.6 to 0.085 moles of component d) and 0.2 to 0.45 moles of component e).

Maleic acid, maleic anhydride and fumaric acid are suitable as component a). Fumaric acid is preferred.

Examples of synthesis component b) include phthalic acid, phthalic anhydride, isophthalic acid, terephthalic acid, hexaor tetrahydrophthalic acid and their anhydrides, endomethylene tetrahydrophthalic acid and its anhydride, and adipic acid.

Examples of synthesis component c) include 1,4-bishydroxymethyl cyclohexane, 2,2-bis-(4-hydroxycyclohexyl)propane, 2-methyl-2,4-bis-(4-hydroxycyclohexyl)-pentane and bis-hydroxymethyltricyclodecane. 2,2-bis-(4-hydroxycyclohexyl)-propane is preferred.

Suitable synthesis components d) include dihydric alcohols having 2 to 6 carbon atoms such as ethylene glycol, propane-1,2-diol, propane-1,3-diol, diethylene glycol, butane-1,3-diol, butane-1,4-diol, neopentyl glycol and hexane-1,6-diol. Ethylene glycol and propane-1,2-diol are preferably used.

In addition to at least one esterifiable hydroxyl group, the $\beta,\gamma$-ethylenically unsaturated ether alcohols e) contain at least one and preferably at least two $\beta,\gamma$-ethylenically unsaturated ether groups corresponding to the formula

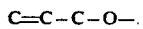

Examples of such ether alcohols include glycerol diallyl ether, trimethylol propane diallyl ether and pentaerythritol triallyl ether. Trimethylol propane diallyl ether is preferred.

The unsaturated polyesters containing allyl ether groups are produced by known methods, for example, by melt esterification or azeotropic esterification of the alcohols and acids or esterifiable derivatives thereof, cf. "Methoden der organischen Chemie" (Houben-Weyl) 4th Edition, Vol. 14/2, Georg Thieme Verlag, Stuttgart 1961, pages 1 to 5, 21 to 33 and 40 to 44.

The polyisocyanate component B) is based on at least one biuret-, isocyanurate-, uretdione- and/or urethane-modified polyisocyanate containing 8 to 30% by weight, preferably 12 to 25% by weight of (cyclo)aliphatically bound isocyanate groups. The term "(cyclo)aliphatically" bound isocyanate groups is used throughout this application to refer to both cycloaliphatically bound and aliphatically bound isocyanate groups. These polyisocyanates generally have a molecular weight of up to 1,000. The production of these polyisocyanates is described, for example, in U.S. Pat. Nos. 3,124,605, 3,183,112, 3,919,218 and U.S. Pat. Nos. 4,324,879. Particularly suitable polyisocyanates are isocyanurate-modified polyisocyanates based on 1,6-diisocyanatohexane (HDI) or on 1-isocyanato-3,3,5-trimethyl-5-isocyanatomethyl cyclohexane (IPDI) or on mixtures of these two diisocyanates and also uretdione- and isocyanurate-modified polyisocyanate mixtures which are based on HDI and obtained in known manner by the oligomerization of HDI using tertiary phosphines as catalysts. Chemically incorporated isocyanurate groups and chemically incorporated uretdione groups are present in these particularly low-viscosity polyisocyanates in a molar ratio of approximately 4:1 to 1:4.

In accordance with the process of the present invention starting components A) and B) are reacted in amounts which are sufficient to provide an NCO:OH equivalent ratio of 0.1:1 to 1:1, preferably 0.2:1 to 0.8:1. The type of reactants and their amounts are also selected to provide a product containing the above-mentioned content of chemically incorporated urethane groups. The reaction of components A) and B) in accordance with the invention is generally carried out in the presence of inert solvents such as ethyl acetate, butyl acetate and/or toluene or in the presence of copolymerizable monomers such as low molecular weight acrylates and/or styrene. The solvents or copolymerizable monomers are used in quantities of 10 to 70% by weight, preferably 20 to 60% by weight, based on the total weight of the reaction mixture, including solvent.

The reaction is generally carried out at a temperature of 40° to 100° C., preferably 50° to 80° C. It is important to ensure that there are no unwanted heat-induced polymerization reactions. When the reaction is carried out at relatively low temperatures within the above ranges, it is advisable to slowly add the organic polyisocyanate B) to the unsaturated polyester A) and to use known catalysts which accelerate the isocyanate addition reaction. Suitable catalysts include alkali metal alcoholates such as sodium ethylate; tertiary amines such as triethylamine, diethylene triamine and dimethyl benzylamine; and tin catalysts such as tin dioctoate and dibutyl tin dilaurate.

To protect the urethanized polyester resins against unwanted premature polymerization, it is often advisable to add during the production of the resins 0.001 to 0.1% by weight, based on the weight of the starting materials used for the production of the urethanized polyester resins, of known polymerization inhibitors or antioxidants such as the quinones, hydroquinones, copper compounds, phosphites, amines or phenols typically used for this purpose.

The products obtained in accordance with the present invention may be used either as such or in combination with the auxiliaries and additives known from paint technology. In other words, they may be directly used as coating compositions without any further additives. In general, however, they are used in combination with the auxiliaries and additives known from paint technology such as fillers, pigments, solvents, flow control agents and the like in the production of coating compositions.

The coating compositions containing the end products of the process according to the invention as binders are suitable for coating any substrates, but are particularly suitable for coating wood, paper, plastics or cartons. The coating compositions may be applied by any of the methods typically used in paint technology, such as casting, spray coating or roll coating.

After the evaporation of any inert solvents used, the coatings may be crosslinked either by high-energy radiation, such as UV light, electron beams or $\gamma$ rays, or by curing with metal salts of siccative acids and (hydro)-peroxides at temperatures between room temperature and 150° C.

Where the coatings are crosslinked by UV irradiation, photoinitiators have to be added to the coating composition. Suitable photoinitiators are the compounds are known and described for example in the book by J. Korsar entitled "Light-Sensitive Systems", J. Wiley & Sons, New York—London—Sydney, 1976.

Other suitable photoinitiators include benzoin ethers such as benzoin isopropyl ether; benzil ketals such as benzil dimethyl ketal; and hydroxyalkyl phenones such as 2-hydroxy-2-methyl-1-phenylpropan-1-one.

The photoinitiators may be used in quantities of 0.1 to 5% by weight, based on the polymerizable components. Depending upon the application envisaged for the compositions according to the invention the photoinitiators may be used either individually or, because of advantageous synergistic effects, as mixtures.

When the coatings produced from the coating compositions are crosslinked by peroxides, siccatives must be incorporated into the coating compositions. Suitable siccatives are known and include cobalt or vanadium salts of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Vanadium compounds which are soluble in the coating compositions and act as siccatives are particularly suitable and include salts of the acids mentioned above and also commercial products such as "Vanadiumbeschleuniger VN-2 (Vanadium Accelerator VN-2)" marketed by Akzo. The siccatives are generally used in the form of organic solutions in quantities such that the metal content, based on binder (urethanized, olefinically unsaturated polyester resin according to the invention), is 0.0005 to 1.0% by weight, preferably 0.001 to 0.5% by weight.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxydicarbonate, tert.-butyl hydroperoxide, cumene hydroperoxide, 2,5-dimethylhexane-2,5-hydroperoxide and diisopropyl benzene monohydroperoxide. These (hydro)peroxides are preferably used in quantities of 1 to 10% by weight, based on the urethanized polyester resin.

In the following examples, all percentages are by weight unless otherwise indicated.

EXAMPLES

Unsaturated polyesters A containing allyl ether groups

Unsaturated polyesters A1 to A3 containing allyl ether groups (see Table 1) were produced by melt condensation under nitrogen at 150° to 180° C. after the addition of 0.02% tolyl hydroquinone.

On completion of the reaction, the products obtained were dissolved in butyl acetate at 60.C (for the quantity of butyl acetate, see Table 2).

TABLE 1

| | (unsaturated polyesters) | | |
|---|---|---|---|
| | Polyester Composition (moles) | | |
| Components | $A_1$ | $A_2$ | $A_3$ |
| Fumaric acid | 1.0 | 1.0 | 1.0 |
| Ethylene glycol | 0.73 | 0.73 | 0.73 |
| 2,2-Bis-(4-hydroxycyclohexyl)-propane | 0.3 | — | — |
| Bis-hydroxymethyl tricyclodecane | — | 0.3 | — |
| Ethoxylated 2,2-bis-(4-hydroxyphenyl)-propane* | — | — | 0.3 |
| Trimethylol propane diallyl ether | 0.35 | 0.35 | 0.35 |
| Acid value (mg KOH/g substance) | 20 | 15 | 20 |

*the reaction product of one mole of 2,2-bis-(4-hydroxycyclohexyl)-propane with two moles of ethylene oxide The following compounds are used as the polyisocyanate B:

Polyisocyanate $B_1$

A 70% solution in a mixture of equal parts by weight of an aromatic solvent (Solvesso 100) and methoxy propyl acetate of an isocyanurate polyisocyanate based on IPDI. NCO content of the solution: 11.5% by weight.

Polyisocyanate $B_2$

An oligomerization product of HDI containing uretdione and isocyanurate groups and prepared by the oligomerization of HDI using tributyl phosphine as catalyst; molar ratio of uretdione to isocyanurate =2:1, NCO content =22% by weight.

Process according to the invention

To produce the urethanized polyester resins of Examples 1 to 3 and Comparison Examples 4 and 5, the quantities of polyester A shown in Table 2, dissolved in butyl acetate, were initially introduced and 0.02% dibutyl tin dilaurate, based on the total weight components A and B, was subsequently added. After heating to 50° C., the quantities of polyisocyanate B set forth in Table 2 were added dropwise at a rate such that the temperature did not exceed 60° C. This temperature was maintained until the NCO content had fallen to below 0.1%.

The urethanized polyester resin of Comparison Example 4 was prepared from Polyester $A_3$, which in turn was prepared from an aromatic alcohol instead of a cycloaliphatic alcohol as required by the present invention.

The urethanized polyester resin of Comparison Example 5 corresponds to Example 1, but contains a quantity of urethane groups that is outside the scope of the invention.

TABLE 2

| | (urethanized polyester resins) | | | | |
|---|---|---|---|---|---|
| Amount weighed | Examples | | | Comparison Examples | |
| in (%) | 1 | 2 | 3 | 4 | 5 |
| Component A | | | | | |
| Polyester $A_1$ | 77.22 | 86.63 | — | — | 92.55 |
| Polyester $A_2$ | — | — | 77.32 | — | — |
| Polyester $A_3$ | — | — | — | 77.84 | — |
| Component B | | | | | |
| Polyisocyanate $B_1$ | 22.78 | — | 22.68 | 22.16 | 7.45 |
| Polyisocyanate $B_2$ | — | 13.37 | — | — | — |
| NCO:OH equivalent ratio | 0.54:1 | 0.61:1 | 0.49:1 | 0.56:1 | 0.15:1 |
| Solids content (%) | 60 | 60 | 40 | 40 | 60 |
| Viscosity (23° C., mPa · s) | 2000 | 1800 | 200 | 200 | 300 |
| Moles urethane | 0.062 | 0.070 | 0.062 | 0.061 | 0.02 |

Use Examples 1 to 3 (Invention) and 4 and 5 (Comparison)

a) Peroxide Curing

The components set forth in Table 3 were mixed and applied s to a glass plate in a wet film thickness of 180 μm. The coatings were dried at room temperature.

The drying time shown was the time necessary for the surface of the paint film to become completely tack-free.

Hardness (Konig pendulum damping, DIN 53 157) and resistance to acetone (values from 0 = resistant to 4 = film dissolved) were measured 24 hours after application of the paint film.

As can be seen from Table 3, Comparison Examples 4 and 5 required longer drying times.

b) Photochemical hardening

The substances shown in Table 4 were mixed and applied to a glass plate in a wet film thickness of 60 μm. The coatings were cured after evaporation of the solvent (5 mins. at 50° C.) under two IST lamps (impulse lamps manufactured by zo Strahlentechnik Hildebrand, Werner und Pfleiderer, output 80 Watts/cm, arranged at a distance of 20 cm) at a processing rate of 14 m/minute.

Comparison Examples 4 and 5 showed lower hardness.

TABLE 3

(Peroxide curing)

| Amount weighed in (g) | Use Examples | | | Comparison Examples | |
|---|---|---|---|---|---|
| | 1 | 2 | 3 | 4 | 5 |
| Urethanized polyester resin of: | | | | | |
| Example 1 | 40 | | | | |
| Example 2 | | 40 | | | |
| Example 3 | | | 60 | | |
| Comparison Example 4 | | | | 60 | |
| Comparison Example 5 | | | | | 40 |
| Nitrocellulose (2.3% butyl acetate)[a] | 19.2 | 19.2 | 19.2 | 19.2 | 19.2 |
| Butyl acetate | 25.8 | 25.8 | 5.8 | 5.8 | 25.8 |
| Xylene | 15.0 | 15.0 | 15.0 | 15.0 | 15.0 |
| Siccative[b] | 0.6 | 0.6 | 0.6 | 0.6 | 0.6 |
| Methyl ethyl ketone peroxide | 0.4 | 0.4 | 0.4 | 0.4 | 0.4 |
| Drying (mins.) | 90 | 90 | 90 | 210 | 120 |
| Hardness (pendulum, damping secs.) | 122 | 115 | 118 | 111 | 129 |
| Acetone resistance | 0 | 0 | 0 | 4 | 1 |

[a]Nitrocellulosewolle E 1440, Wolff-Walsrode
[b]Vanadiumbeschleuniger VN-2, Akzo

TABLE 4

(Photochemical hardening)

| Amount weighed in (g) | Use Examples | | | Comparison Examples | |
|---|---|---|---|---|---|
| | 1 | 2 | 3 | 4 | 5 |
| Urethanized polyester resin of: | | | | | |
| Example 1 | 67.0 | | | | |
| Example 2 | | 67.0 | | | |
| Example 3 | | | 100 | | |
| Comparison Example 4 | | | | 100 | |
| Comparison Example 5 | | | | | 67.0 |
| Butyl Acetate | 33.0 | 33.0 | — | — | 33.0 |
| Photoinitiator[a] | 0.8 | 0.8 | 0.8 | 0.8 | 0.8 |
| Hardness (pendulum damping, secs.) | 84 | 71 | 84 | 48 | 36 |

[a]Darocur 1173, 2-Hydroxy-2-methyl-1-phenylpropan-1-one, Merck

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claims is:

1. A process for the production of an olefinically unsaturated polyester resin containing at least 0.025 moles of urethane groups per 100 g of resin which comprises reacting
    A) an olefinically unsaturated polyester resin which contains alcoholic hydroxyl groups, has a molecular weight ($M_n$) of 800 to 10,000, an acid value of 0 to 50 and a hydroxyl number of 30 to 120, and comprises the reaction product of
        I) a dicarboxylic acid component comprising
            a) 90 to 100 mole percent of maleic acid, maleic anhydride and/or fumaric acid and
            b) 0 to 10 mole percent of an acid or anhydride component comprising a member selected from the group consisting of aromatic dicarboxylic acids containing 8 carbon atoms, saturated aliphatic dicarboxylic acids containing 4 to 10 carbon atoms, saturated cycloaliphatic dicarboxylic acids containing 6 to 10 carbon atoms, olefinically unsaturated cycloaliphatic carboxylic acids containing 6 to 10 carbon atoms and anhydrides of these saturated and olefinically unsaturated dicarboxylic acids and
        II) 1.1 to 1.5 moles, based on one mole of the dicarboxylic acid component, of a polyol component comprising
            c) 0.1 to 0.5 moles of at least one saturated cycloaliphatic diol having 6 to 18 carbon atoms,
            d) 0.5 to 0.9 moles of at least one saturated aliphatic diol having 2 to 6 carbon atoms and
            e) 0.1 to 0.5 moles of at least one $\beta$, $\gamma$-ethylenically unsaturated ether alcohol having 5 to 14 carbon atoms,
    B) an organic polyisocyanate comprising a member selected from the group consisting of biuret-, isocyanurate-, uretdione- and urethane-modified polyisocyanates having 8 to 30% by weight of (cyclo)aliphatically bound isocyanate groups
in an amount sufficient to provide a ratio of isocyanate groups of component B) to hydroxyl groups of component A) of 0.1:1 to 1:1.

2. An olefinically unsaturated polyester resin containing at least 0.025 moles of urethane groups per 100 g of resin which comprises the reaction product of
    A) an olefinically unsaturated polyester resin which contains alcoholic hydroxyl groups, has a molecular weight ($M_n$) of 800 to 10,000, an acid value of 0 to 50 and a hydroxyl number of 30 to 120, and comprises the reaction product of
        I) a dicarboxylic acid component comprising
            a) 90 to 100 mole percent of maleic acid, maleic anhydride and/or fumaric acid and b) 0 to 10 mole percent of an acid or anhydride component comprising a member selected from the group consisting of aromatic dicarboxylic acids containing 8 carbon atoms, saturated aliphatic dicarboxylic acids containing 4 to 10 carbon atoms, saturated- cycloaliphatic dicarboxylic acids containing 6 to 10 carbon atoms, olefinically unsaturated cycloaliphatic dicarboxylic acids containing 6 to 10 carbon atoms and anhydrides of these saturated and olefinically unsaturated dicarboxylic acids and II) 1.1 to 1.5 moles, based on one mole of the dicarboxylic acid component, of a polyol component comprising c) 0.1 to 0.5 moles of at least one saturated cycloaliphatic diol having 6 to 18 carbon atoms, d) 0.5 to 0.9 moles of at least one saturated aliphatic diol having 2 to 6 carbon atoms and e) 0.1 to 0.5 moles of at least one $\beta$, $\gamma$-ethylenically unsaturated ether alcohol having 5 to 14 carbon atoms, with B) an organic polyisocyanate comprising a member selected from the group consisting of biuret-, isocyanurate-, uretdione- and urethane-modified polyisocyanates having 8 to 30% by weight of (cyclo)aliphatically bound isocyanate groups in an amount sufficient to provide a ratio of isocyanate groups of component B) to hydroxyl groups of component A) of 0.1:1 to 1:1.

3. A coating which is prepared by curing a coating composition comprising the olefinically unsaturated polyester resin of claim 2 by free radical polymerization.

4. The coating of claim 3 wherein said coating composition additionally contains a siccative and is cured in the presence of peroxides.

5. The coating of claim 3 wherein said siccative comprises a vanadium compound which is soluble in said coating composition.

* * * * *